(12) United States Patent
Körner et al.

(10) Patent No.: US 10,479,186 B2
(45) Date of Patent: Nov. 19, 2019

(54) HYBRID CAR IN P0- OR P1-CONFIGURATION

(71) Applicant: Hella GmbH & Co. KGaA, Lippstadt (DE)

(72) Inventors: André Körner, Lippstadt (DE); Marc Nalbach, Paderborn (DE); Sebastian Kahnt, Erlangen (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 15/759,647

(22) PCT Filed: Sep. 21, 2016

(86) PCT No.: PCT/EP2016/072427
§ 371 (c)(1),
(2) Date: Mar. 13, 2018

(87) PCT Pub. No.: WO2017/050826
PCT Pub. Date: Mar. 30, 2017

(65) Prior Publication Data
US 2019/0039448 A1 Feb. 7, 2019

(30) Foreign Application Priority Data

Sep. 25, 2015 (EP) .................... 15186832

(51) Int. Cl.
*B60K 6/485* (2007.10)
*B60K 6/387* (2007.10)
(Continued)

(52) U.S. Cl.
CPC ............. *B60K 6/485* (2013.01); *B60K 6/387* (2013.01); *B60W 10/02* (2013.01); *B60W 10/06* (2013.01);
(Continued)

(58) Field of Classification Search
CPC ...................................... B60K 6/485
See application file for complete search history.

(56) References Cited

U.S. PATENT DOCUMENTS 6,048,289 A 4/2000 Hattori et al.
6,190,282 B1 2/2001 Deguchi et al.
(Continued)

FOREIGN PATENT DOCUMENTS

DE 19926510 A1 12/1999
DE 102012224453 A1 4/2014

*Primary Examiner* — Nicholas K Wiltey
*Assistant Examiner* — Tiffany K Luu
(74) *Attorney, Agent, or Firm* — Husch Blackwell LLP

(57) ABSTRACT

A method for controlling a car with a parallel hybrid system comprising at least a combustion engine and an electrical machine in P0- or P1-configuration, with a clutch for connecting the combustion engine's output shaft with at least one drive shaft. Steps include determining a power demand $P_d$, and decoupling the combustion engine from the drive shaft if the power demand $P_d$ is below a first threshold $P_1$. Coupling the combustion engine with the drive shaft when the power demand $P_d$ is above the first threshold $P_1$ provides additional fuel savings when the method further comprises shutting off the combustion engine and providing power to the drive shaft by providing electrical power to the electrical machine to drive the car, when the power demand $P_d$ is between the first threshold $P_1$ and a second threshold $P_2$. The second threshold $P_2$ is greater than the first threshold $P_1$, i.e. if $P_1 < P_d < P_2$.

14 Claims, 2 Drawing Sheets

(51) Int. Cl.
*B60W 10/02* (2006.01)
*B60W 10/06* (2006.01)
*B60W 10/08* (2006.01)
*B60W 20/10* (2016.01)
*B60W 20/40* (2016.01)
*B60W 30/18* (2012.01)
*B60K 6/48* (2007.10)
*B60W 20/00* (2016.01)

(52) U.S. Cl.
CPC ............ *B60W 10/08* (2013.01); *B60W 20/10* (2013.01); *B60W 20/40* (2013.01); *B60W 30/18072* (2013.01); *B60K 6/48* (2013.01); *B60W 20/00* (2013.01); *B60W 2030/1809* (2013.01); *B60W 2030/18081* (2013.01); *B60W 2510/244* (2013.01); *B60W 2540/10* (2013.01); *Y02T 10/6221* (2013.01); *Y02T 10/6226* (2013.01); *Y02T 10/6286* (2013.01)

(56) References Cited

U.S. PATENT DOCUMENTS

2001/0039230 A1* 11/2001 Severinsky ............ B60H 1/004
477/3
2003/0015358 A1 1/2003 Abe et al.
2011/0231049 A1* 9/2011 Le Brusq ................. B60K 6/48
701/22

* cited by examiner

HYBRID CAR IN P0- OR P1-CONFIGURATION

CROSS REFERENCE

This application claims priority to PCT Patent Application No. PCT/EP2016/072427, filed 21 Sep. 2016, which itself claims priority to EP 3,147,147, filed 25 Sep. 2015, the entirety of both of which are hereby incorporated by reference.

FIELD OF THE INVENTION

The invention relates to an operating method of a mild parallel hybrid vehicle system in P0- or P1-configuration and a controller for such a vehicle, e.g. a car.

BACKGROUND

In the past, most commercially available cars have been powered by a combustion engine. One step to optimize fuel efficiency is to install a mild parallel hybrid drive. Such parallel hybrid drives comprise a combustion engine being coupled mechanically with the wheels of at least one of the front and rear axles. The mechanical coupling usually comprises at least one clutch coupling the output shaft of the combustion engine and to the input shaft of a transmission gear, (briefly gear). The output shaft of the gear is coupled via a differential gear (briefly differential) and drive shafts with the wheels. In addition an electrical machine is coupled to the wheels. Accordingly, drive power can be provided to the wheels by the electrical machine and as well by the combustion engine, i.e. 'in parallel'. The electric energy for powering the electrical machine is provided by a battery.

In mild parallel hybrid cars, the battery (as synonym for at least one battery or the battery system) and the in most cases as well the electrical machine are dimensioned to only support the combustion engine, to thereby enable operating the combustion engine to an enhanced extent in its most efficient power regime. Additionally the electrical machine is used as booster for short time high power demands. The additional electrical machine thus enables installation of a smaller combustion engine without the electrical machine.

In the P0-configuration the electrical machine is coupled to the output shaft e.g. the crankshaft at the combustion engine's front, i.e. at the side of the combustion engine that is facing away from the clutch. In the P1-configuration the electrical machine is coupled to the same output shaft, but at the combustion engine's rear, i.e. at the side of the combustion engine that is facing towards the clutch. In the P1-configuration the electrical machine is between the clutch and the crankshaft. So to speak one may say that in both the P0- and in the P1-configuration the electrical machine is coupled to the output shaft of the combustion engine.

In the P0- and P1-configurations the electrical machine can start the combustion engine, thus an additional starter can be omitted. The electrical machine can as well be used as a generator for loading the batteries, if the combustion engine drives the electrical machine. The electrical machine may as well be used as a brake system to convert kinetic energy into electric energy, usually referred to as recuperation. For recuperation, the clutch between the wheels and the output shaft of the combustion engine must be closed.

To save fuel, cars with a P0- or P1-configuration are often configured for 'coasting'. 'Coasting' means to decouple the combustion engine from the wheels, e.g. by opening a clutch when the mechanical power demand is low, e.g. downhill or when approaching a traffic light or a stop sign. During coasting the combustion engine may be temporarily shut-off, e.g. by cutting off fuel supply by keeping fuel injection nozzles, commonly referred to as 'injectors' closed. However, in this case the power for auxiliary systems like for servo steering, brake servo, air conditioning, lights etc. must be provided by the car's battery. If the state of charge (SOC) of the battery is low, the combustion engine can idle or spin slightly faster, only to drive the electrical machine, which in turn provides electrical power for supplying the auxiliary systems and/or for charging the battery.

Only to avoid ambiguities, an electrical machine at least enables to convert electric energy into mechanical energy, it may thus be used as electric motor. The electrical machine may as well be configured to convert mechanical energy into electrical energy. It may thus as well be used as generator. In some textbooks an electrical machine may as well be a transformer for converting a voltage of an AC-power source into another voltage, but this is not intended here. In this patent an electrical machine is an electric motor that optionally may be used as generator.

SUMMARY OF THE INVENTION

The problem to be solved by the invention is to enhance fuel efficiency of cars or other vehicles with mild parallel hybrid systems in P0- or P1-configuration.

According to the invention, a vehicle, e.g. a car with a parallel hybrid system comprising at least a combustion engine and an electrical machine in P0- or P1-configuration is controlled to optimize fuel consumption. The combustion engine can be any usual type of combustion engine transforming chemical energy into mechanical energy. Typically the combustion engine has at least one reciprocating piston, like e.g. an Otto type combustion engine, a two-stroke engine, a Diesel engine and the like. A Wankel engine could be used as well of course. Below, we will name the output shaft of the combustion engine crank shaft, but only because car's engines usually have a crank shaft. This shall not exclude Wankel engines or other less commonly used combustion engines having non cranked output shafts.

The electrical machine of the hybrid system is usually supplied with electrical power being stored in some type of battery, e.g. a Lithium-Polymer battery. The term Battery is intended to describe any rechargeable reservoir of electrical energy. For example the battery may comprise one or more electrochemical cells and/or one or more capacitors and/or any other kind of charge storage means.

A controller may control the power input to the electrical machine and thus as well the mechanical power provided by the electrical machine to the wheels. The controller as well controls the power output of the combustion engine. This is usually obtained by controlling the fuel flow and/or the combustion air, e.g. by controlling the manifold pressure, the injectors and/or the valves. If the combustion engine is shut-off it does not consume any fuel, but the output shaft may still rotate. This is as well referred to by wordings like 'cutting the fuel' or 'interrupting the fuel flow'. The combustion engine's output shaft may rotate or not, but the combustion engine does not consume fuel. In current combustion engines the fuel flow can be cut or interrupted e.g. by simply keeping the fuel injectors closed. These injectors may be controlled by said controller.

The method comprises determining an actual power demand $P_d(t)$ (briefly $P_d$), wherein t denotes the time. The power demand $P_d$ can be determined, e.g. by detecting an accelerator pedal and/or hand throttle setting. The power demand $P_d$ can as well be determined and provided by a cruise control system and/or an electronic stability control (ESC) system to a controller for controlling fuel consumption of the combustion engine and the electrical power consumption of the electrical machine.

If the power demand $P_d$ is below a first power threshold $P_1$ the combustion engine is decoupled from the wheels. For example, the controller may provide a signal for opening a clutch connecting the combustion engine's output shaft and the gear. This can be considered as 'passive coasting' or 'freewheeling'. The combustion engine may be shut-off or drive the electrical machine for supplying the electrical power to the battery and/or auxiliary systems during passive coasting depending on the state of charge SOC of the battery.

When the power demand $P_d$ raises above (or otherwise is above) the first threshold $P_1$ the combustion engine may be coupled with at least one of the wheels, for example by closing the clutch to thereby connect the output shaft of the combustion engine with the input shaft of the gear. For example, the controller may provide a signal for closing the clutch. If the power demand $P_d$ is above said first threshold $P_1$ but below a second threshold $P_2$ (i.e. $P_1 < P_d < P_2$) the fuel supply of the combustion engine may be shut-off and the power demand $P_d$ may be provided and thus satisfied by the electrical machine only. Thus the electrical machine drives the crank shaft while the combustion engine is shut-off to thereby drive at least one wheel being coupled to the crank shaft (e.g. via the clutch, the gear, a differential and the drive shaft). This is referred to as 'active coasting'.

If the power demand $P_d$ cannot be satisfied by the electrical machine only ($P_2 < P_d$), the combustion engine is (re) started, i.e. provided with fuel. There are two scenarios for this situation: Either the power demand $P_d$ simply exceeds the rated power of the electrical machine and/or the battery cannot provide the corresponding electrical power for a defined amount of time, e.g. its state of charge SOC(t) is below a threshold $SOC_{min}$. By the above explained method the passive coasting (combustion engine decoupled from wheels) is extended by an active coasting (combustion engine off, but coupled to the wheels and electrical machine on and in motor mode). Unexpectedly this measure shows a reduction of $CO_2$ emissions of about 3-4% in the typical standard test cycles like NEDC (New European Driving Cycle} and WLTC (Worldwide harmonized Light vehicles Test Cycle) although the electrical machine has to provide the power for spinning the combustion engine, because it is mounted in the P0- or P1-configuration.

The above explained 'active coasting' is to be distinguished from 'silent running' as suggested for automated parking or other low speed operations. Thus active coasting can be used as well in higher speed regimes like e.g. at speeds above 15 km/h or above 20 km/h or even higher, like for example above 30 km/h. The point is that the currently commercially available parallel hybrid systems in P0 or P1-configuration have electrical machines with a rated power of typically 10-20 kW. This power was initially intended to be used for boosting only, but of course it is sufficient to maintain even higher speeds like 50 km/h which are typical in urban traffic. For example, the vehicle may be accelerated to an intended cruising speed using both the combustion engine and the electrical machine. But as soon as the cruising speed is obtained, the power demand $P_d$ drops below the second threshold $P_2$ and the combustion engine may be shut-off, e.g. by simply cutting the fuel. If the power demand Pd raises again, e.g. above the second threshold $P_2$, the combustion engine is preferably restarted, e.g. by establishing the fuel flow.

In addition recuperation of kinetic energy can be obtained if the power demand $P_d$ becomes negative, i.e. if $P_d < 0 < P_1$, e.g. when driving downhill and trying to maintain the speed or when braking. Now, the clutch is closed and the electrical machine may be used as generator to convert mechanical energy into electrical energy and thus provides electrical power to the battery and/or auxiliary systems. The combustion engine may be shut-off during recuperation. In practice the power demand threshold for recuperation is not zero, but a negative number $P_{ne}$ due to frictional or other losses of the gear, the output shaft etc.

The second threshold $P_2$ can depend on the multiple variables $v_i$ with $1 \le i \le n$ and n being an integer representing the number of variables, i.e. $P_2 = P_2(v_1, \ldots, v_n)$. For example, the second threshold may be raised if the combustion engine was stopped and it may be lowered again if the combustion engine restarted. Thus, if $v_1 = m_s$ symbolizes the state of the combustion engine, e.g. $m_s = 0$ for shut-off and $m_s > 0$ for combustion engine on, the above suggestion can be expressed as $P_2(m_s = 0) > P_2(m_s > 0)$. This measure further reduces the fuel consumption and the life cycle of the system as the combustion engine changes its state (on or off) less often.

Further, the second threshold $P_2$ is preferably a function of the state of charge (SOC) of the vehicle's battery system, i.e. one of the variables $v_i$ can be the SOC, i.e. $P_2 = P_2(SOC) = P_2(\ldots, SOC, \ldots)$. Thereby, the off- and on-times of the combustion engine can be optimized as well as the battery cycles to increase the battery life, provided the power demand is not immediately raised shutting it off. For example, $P_2$ ($SOC = SOC_i$) $< P_2$ ($SOC = SOC_j$) for all $SOC_i < SOC_j$.

A further variable that is preferably accounted for when determining an actual $P_2$ is the battery temperature $T_{Bat}$ ($v_i = T_{Bat}$, $P_2 = P_2 (T_{Bat})$, $P_2 (\ldots, T_{Bat} \ldots )$), as battery overheating should and can be avoided by reducing $P_2$. Beyond, if the battery temperature starts to lower below a threshold, $P_2$ can be raised to maintain the battery temperature within an optimized temperature range or at least within its operating limits.

Beyond, the combustion engine is preferably stopped, if the power demand $P_d$ is below the first threshold $P_1$ and if at the same time the state of charge of the vehicle's battery is above a first SOC threshold $SOC_1$. This is a safety measure to enhance the battery lifetime and to save fuel. In other words, if the state of charge SOC is greater than $SOC_1$ and the power demand $P_d$ is below the first threshold $P_1$, the combustion engine is preferably stopped.

If the power demand $P_d$ is above the first threshold $P_1$ and below the second threshold $P_2$ the combustion engine is preferably shut-off (e.g. by interrupting the fuel supply) only if at the same time the state of charge SOC of the vehicle's battery system is above a second SOC threshold $SOC_2$. The second SOC threshold $SOC_2$ is preferably greater than the first SOC threshold $SOC_1$, i.e. $SOC_1 < SOC_2$. This further enhances the battery lifetime and enables to save further fuel: During passive coasting only the auxiliary systems, like e.g. servo brake, servo steering, lights and the like, must be supplied with electrical power. The electrical engine remains shut-off or is in its generator mode (when the clutch is closed, e.g. when driving downhill or slowing down). Thus the electrical power consumption during passive coasting is much lower as during active coasting, i.e. when the electrical machine is used as motor. Accordingly setting $SOC_1$ below the $SOC_2$ enables to passively coast, if an active coasting is not possible because the additional power required to supply the electrical machine to thereby establish active coasting would draw more power or energy out of the battery as can be provided by the battery at the moment without reducing its lifetime.

In particular when actively coasting, it is advantageous to calculate a predictive energy demand value $E_p(t)$, briefly ($E_r$) and to adapt the second threshold $P_2$ to said predictive energy demand value $E_p$. In other words, the second threshold $P_2$ may be a function of the predictive energy demand value $P_2=P_2(E_r)=P_2(\ldots, E_p, \ldots)$. The predictive energy demand $E_p$ may be calculated as Energy required in the next n-minutes. The calculation may take into account geographical data, traffic and route information, speed limits, throttle control input etc.

For example, the second threshold $P_2$ may be lowered when the predictive energy demand $E_p$ raises ($E_p(t_1) < E_r(t_2) + E_{threshold}$, $t_i < t_2$; $t_1$, $t_2$ being times of predictions and $E_{threshold}$ an energy threshold) to thereby conserve electrical energy in the battery or even to enhance the state of charge SOC to be able to run the combustion engine close to its optimum efficiency point when advancing the predicted raise in power demand and/or when reaching the raised power demand. Such power demand predictions may e.g. include geographical information (uphill/downhill) or expected turns which require a phase of acceleration after passing the turns. In the same way P2 can be lowered, if the predictive energy demand reduces as a function of time, e.g. because the vehicle will reach a point where the street will start descending, thus recuperation mode or passive coasting is likely when descending.

The method is preferably implemented in a controller for controlling a parallel hybrid system comprising at least said combustion engine and said electrical machine in a P0- and/or P1 configuration. The controller may be configured to determine a power demand $P_d$, e.g. by reading a throttle input sensor and/or by receiving a power control signal from a cruise control circuit or software and/or an electronic stability control system or the like. The controller may further be configured to provide a signal to a clutch to thereby decouple the combustion engine from the drive shaft if the power demand $P_d$ is below a first threshold $P_1$ and to provide a signal to the clutch to thereby couple the combustion engine with the drive shaft if the power demand is above the first threshold $P_1$. The controller may interrupt the fuel supply of the combustion engine and provide power to at least one of the wheels by providing electrical power to the electrical machine to drive the vehicle if the power demand is between said first threshold $P_1$ and a second threshold $P_2$, wherein said second threshold $P_2$ is greater than the first threshold $P_1$, i.e. $P_1 < P_d < P_2$. The other above explained method steps may as well be controlled by the controller

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
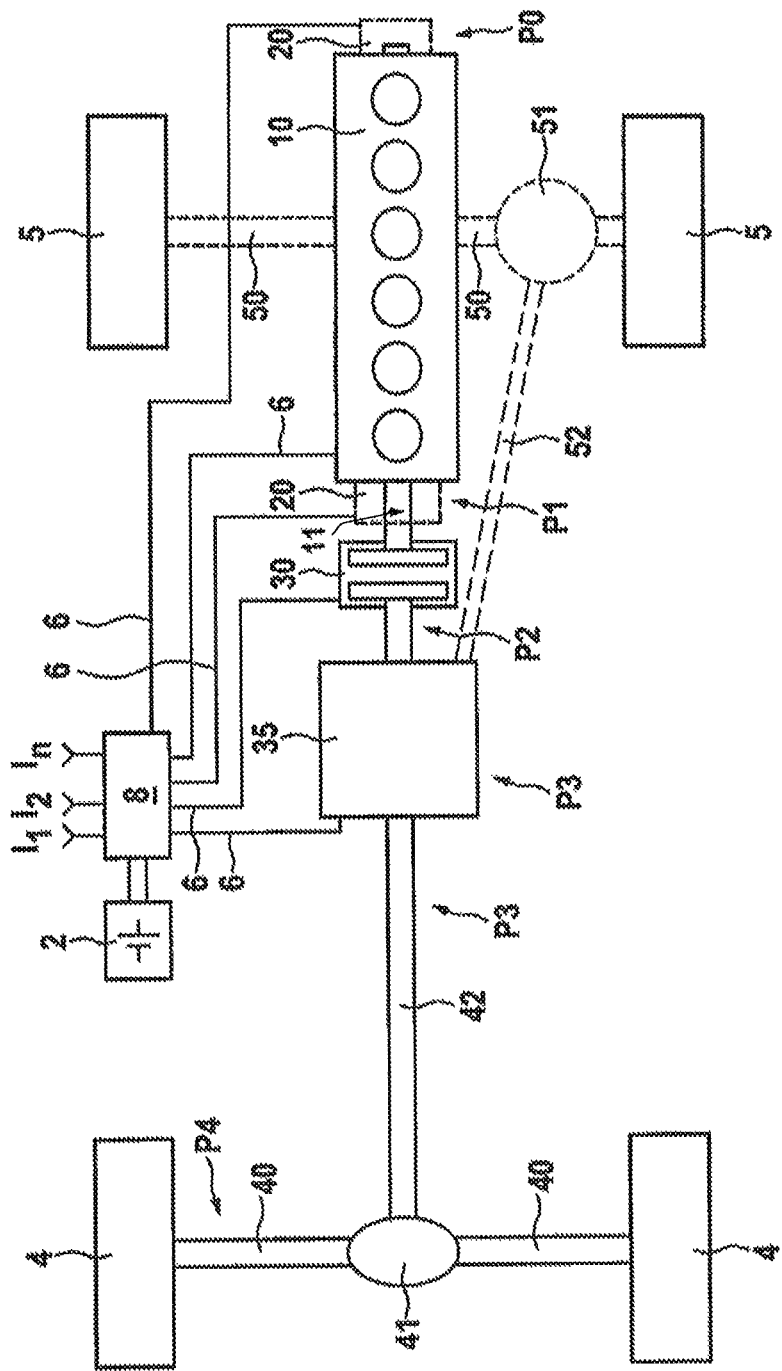
FIG. 1 shows a mild hybrid system.

FIG. 1 shows a simplified mild parallel hybrid system in P0- and in P1-configuration: As usual, the vehicle has two front wheels 4 and two rear wheels 5, at least two of them are driven are by a mild parallel hybrid system, briefly hybrid system herein. The hybrid system comprises a combustion engine 10 with a crank shaft 11, which is the output shaft of the combustion engine 10. At least one electrical machine 20 is coupled to the output shaft 11. In the figure two electrical machines are indicated by dashed boxes in the P0 and in the P1 configuration, but only to indicate the P0 and the P1 position. In practice a single electrical machine is sufficient. The P0-position is at the side of the combustion engine 10 that faces away from the clutch 30. The P1-position is the position between the clutch 30 and the combustion engine 20. In the figure as well the P3, P4 and P5 positions are indicated, but only to clarify enumeration of the positions: In the P2-configuration the electrical machine would be coupled to the input shaft of the gear box 35. Integration of the electrical machine into the gear 35 or coupling it to the output shaft of the gear is referred to as P3-configuration. The P4-configuration is to couple the electrical machine to the drive shaft connecting the differential 41 and the wheels 4.

As already apparent from the above, the crank shaft 11 is coupled with a clutch 30 in between to a transmission gear 35. The output shaft of the gear 35 is connected e.g. by a cardan shaft 42, 52 or some other means to at least one differential gear 41, 51, which are connected as usual via drive shafts 40, 50 to the wheels 4, 5. In the figure, the gear 35 is coupled to the front differential 51 and as well to a rear differential 41. But of course the vehicle can only be a two wheel drive car as well, i.e. one of the front and rear differentials 41, 51 and the corresponding drive shafts 40, 50 and connection means 42, 52 for connecting the gear 35 with the corresponding differential 41, 51 can be omitted. A rear wheel drive is obtained, by omitting the parts 50, 51, 52 indicated in dashed lines. Omitting the parts 40, 41, 42 in solid lines provides a front wheel drive.

The car further comprises a controller 8. The controller 8 controls the electrical power being exchanged between the electrical machine 20 and a battery 2 e.g. by control lines 6. For example, the controller 8 can provide the electrical machine 20 with power from the battery to drive the crankshaft 11 via control lines 6 or at least a control signal. Alternatively, the controller 8 may charge the battery with power provided by the electrical machine 20, if the crank shaft 11 drives the electrical machine 20.

The controller 8 further controls the combustion engine 10 as indicated by a further control line 6, i.e. the fuel flow and thus the output power of the combustion engine. The controller 8 is further connected with a clutch 30 by a further control line 6 to close or open it, to thereby connect or disconnect the crank shaft with the gear 35 and thus with the wheels 4, 5.

The controller may have several inputs $I_i$, where i stands for an integer enumerating the input. The input ports may be connected to any kind of sensors, e.g. a battery temperature sensor, an acceleration pedal and/or hand throttle sensor, acceleration sensors. Beyond the input ports may enable the controller to communicate e.g. using a communication bus (e.g. a bidirectional communication bus like CAN, FLEXRAY, . . . ) with other components of the car, e.g. with a navigation system, an electronic stability control system or the like.

The hybrid system is explained with respect to a vehicle having two axles. But of course the vehicle and the invention is not limited to such vehicle. The invention can of course as well be applied to vehicles having any number of axles, e.g. three or more axles. The invention can as well be used in trikes and motor cycles. In the case of a motor cycle the drive shafts, the differential and the cardan shaft are typically replaced by a belt drive, a chain drive or a cardan drive, but this does not affect controlling of the combustion engine and the electrical machine to enable passive and active coasting with hybrid systems in P0- or P1-configuration.

Figure 2:
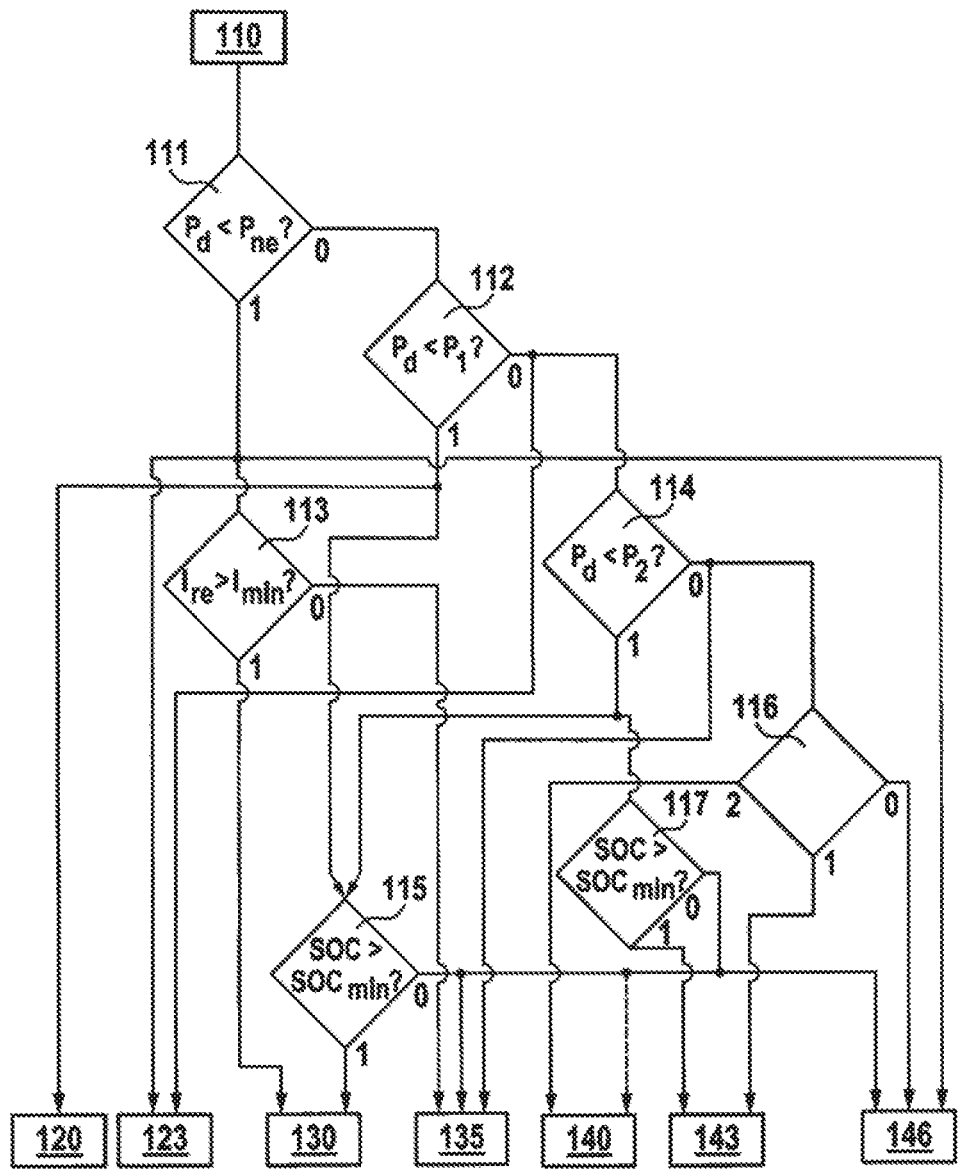
FIG. 2 shows a method scheme.

In FIG. 2 a method for controlling a hybrid system in P0- and/or P1-configuration is depicted. In a first step 110 input parameters like a power demand $P_d$ and power thresholds $P_1$ and $P_2$ may be determined.

Next the power demand $P_d$ is compared to some thresholds: The power demand $P_d$ is compared to a negative threshold as indicated in box 111, i.e. if $P_d$<-Abs($P_{ne}$). If the condition is met as indicated by "1" for 'true', the controller may activate the recuperation mode of the hybrid system, by closing the clutch indicated as box 123 and operating the electrical machine 20 in a generator mode indicated as box 146, where it provides electrical power to the battery 2 or some auxiliary systems like e.g. a servo steering, lights, radio, air conditioning, etc. The combustion engine 10 may be switched on (box 135) or off (box 130) depending on the electrical power being provided by the electrical machine if the combustion engine is off. This is indicated as '$I_{re}$>$I_{min}$?' (box 113), i.e. the current (or power) due to the recuperation of the kinetic energy is compared to some minimum $I_{min}$. If the recuperated current $I_{re}$ (or power) is above the minimum, the combustion engine can be shut-off 130, if not it can be on 135 to drive the electrical machine as well. In practice this can be implemented e.g. by drawing the required electrical power from the electrical machine and controlling the speed of the vehicle by varying the fuel flow of the combustion engine or activation of the brakes as required.

Continuing the 'false' output of decision box 111, which is indicated by '0' it is tested if the power demand $P_d$ is below a first power threshold $P_1$. This first threshold is chosen to enable passive coasting, i.e. the clutch is opened as indicated by box 120. The combustion engine may be stopped or run with low power, e.g. for charging the battery. The latter is indicated by box 115 symbolizing checking if the state of charge SOC is above a minimum value $SOC_{min}$, which can be set in step 110 as a function of multiple variables, like e.g. the expected Energy requirement for the next n-seconds or even minutes, battery temperature, available capacity etc. If the condition is met (indicated by '1'), the combustion engine can be shut-off. If not it should run and the electrical machine is in generator mode 146 until the condition is met. If the SOC does not require urgent recharging, the electrical machine may be switched off 140 instead (see dashed line). The corresponding decision box has been omitted to reduce the complexity of the scheme.

If the power demand $P_d$ is in between of the first threshold $P_1$ and a second threshold $P_2$ being greater $P_1$, i.e. if $P_1$<$P_d$<$P_2$ is true (indicated as '1' in box 114), the vehicle is configured for active coasting: The clutch is closed as indicated by the connection with box 123 (in any case if $P_1$<$P_d$) and the combustion engine is shut-off 130, provided the SOC allows to (see box 117) and the vehicle is driven by the electrical machine only (electrical machine on 143). If the SOC is too low for active coasting, the combustion engine is started to provide the necessary power. The electrical engine may be used in generator mode 146 or switched off 140 (dashed line). The corresponding decision box was omitted to reduce the complexity of the figure.

If the power demand $P_d$ exceeds the second threshold $P_2$ box 114 provides '0' and the vehicle is to be driven at least by the combustion engine 135, accordingly 15 the clutch is closed 123 (this is the case as box 112 provides '0' and the corresponding output is connected with box 123). The combustion engine's power may be used to charge the battery 146 or to maintain its SOC. Alternatively the electrical machine may be switched off 140 or if the power demand $P_d$ requires and the SOC enables to, it may be switched on 143 as symbolized by box 116. Box 116 is in fact a very complex algorithm including load balancing between the combustion engine and the electrical machine. But this box 116 can be considered as the normal operation mode of prior art mild parallel hybrid systems that are already commercially available. Thus, there is no need explain its operation in detail again.

LIST OF REFERENCE NUMERALS 2 battery
4 wheels
5 wheels
6 control lines
8 controller
10 combustion engine
11 output shaft I crank shaft
20 electrical machine
30 clutch (at least one)
35 gear I gear/transmission
40 drive shaft
41 differential gear
42 transmission means e.g. cardan shaft
50 drive shaft
51 differential gear
52 transmission means e.g. cardan shaft
110 determining step
111 comparison $P_d$<-Abs($P_{ne}$)?
112 test $P_d$<$P_1$?
113 test $I_{re}$<$I_{min}$?
114 test $P_d$<$P_2$?
115 test SOC>$SOC_{min}$?
116 standard load balancing routine
117 test SOC>$SOC_{min}$?
120 clutch open
123 clutch closed
130 combustion engine off
135 combustion engine on
140 electrical machine off
143 electrical machine in motor mode
146 electrical machine in generator mode
P0 position of electrical machine
P1 position of electrical machine
P2 position of electrical machine in another configuration
P3 position of electrical machine in another configuration
P4 position of electrical machine in another configuration
$I_l$, $I_i$, $I_n$ input ports

The invention claimed is:

1. A method for controlling a vehicle with a parallel hybrid system that includes at least a combustion engine and an electrical machine in at least one of a P0- and P1 configuration with a clutch for connecting the combustion engine's output shaft with at least one drive shaft, wherein the method comprises:

determining a power demand ($P_d$), decoupling the combustion engine from the at least one drive shaft when the power demand ($P_d$) is below a first threshold $P_1$, coupling the combustion engine with the at least one drive shaft when the power demand ($P_d$) is above the first threshold $P_1$, shutting off the combustion engine and providing power to the at least one drive shaft by providing electrical power to the electrical machine to drive the vehicle, when the power demand ($P_d$) is between said first threshold $P_1$, and a second threshold P2, wherein said second threshold $P_2$ is greater than the first threshold $P_1$, i.e. $P_1 < P_d < P_2$.

2. The method of claim 1 wherein the combustion engine is restarted when the power demand ($P_d$) is greater or equal than the second threshold $P_2$, i.e. if $P_d \geq P_2$.

3. The method of claim 1 wherein the second threshold $P_2$ is a function of a state of charge (SOC) of the vehicle's battery.

4. The method of claim 1 wherein the combustion engine is shut-off when the power demand ($P_d$) is below the first threshold $P_1$ and if at the same time a state of charge (SOC) of the vehicle's battery system is above a first SOC threshold ($SOC_1$).

5. The method of claim 1 wherein when the power demand ($P_d$) is below the second threshold $P_2$, the combustion engine is stopped only if at the same time a state of charge of the vehicle's battery is above a first SOC threshold.

6. The method of claim 1 wherein the method further comprises calculating a predictive energy demand value ($E_p$) and in that the second threshold $P_2$ is a function of the predictive energy demand value ($E_p$).

7. The method of claim 6, wherein a predictive energy demand value ($E_p$) is calculated based on geographical information about an intended or expected route.

8. The method of claim 1 wherein when the power demand ($P_d$) is below the first threshold and below a negative power threshold ($P_{ne}$), i.e. $P_d < P_{ne} < P_1$ a clutch is closed to couple at least one wheel with the combustion engine's output shaft which drives the electrical machine to convert kinetic power provided by wheels to the electrical machine into electrical power.

9. A controller for controlling at least a combustion engine and an electrical machine of a vehicle's parallel hybrid system wherein said combustion engine and said electrical machine are in at least one of a P0- and P1-configuration, wherein the controller is configured to:
   determine a power demand ($P_d$),
   provide a signal to a clutch to thereby decouple the combustion engine from at least one drive shaft if the power demand ($P_d$) is below a first threshold $P_1$,
   provide a signal to the clutch to thereby couple the combustion engine with the at least one drive shaft if the power demand is above the first threshold $P_1$
   wherein the controller shuts the combustion engine off and provides power to the at least one drive shaft by providing electrical power to the electrical machine to drive the vehicle when the power demand ($P_d$) is between said first threshold $P_1$ and a second threshold $P_2$, wherein said second threshold $P_2$ is greater than the first threshold $P_1$, i.e. $P_1 < P_d < P_2$.

10. The controller of claim 9, wherein the controller is configured:
    to run the combustion engine when the power demand ($P_d$) is greater or equal than the second threshold $P_2$, i.e. if $P_d \geq P_2$ and/or to close the clutch to thereby couple at least one wheel with the combustion engine's output shaft and to control the electrical machine to convert kinetic power provided by wheels to the electrical machine into electrical power when the power demand ($P_d$) is below the first threshold and below a negative power threshold ($P_{ne}$), i.e. $P_d < P_{ne} < P_1$.

11. The controller of claim 9 wherein the controller determines the second threshold $P_2$ as a function of at least one variable $V_j$.

12. The controller of claim 9 wherein the controller is configured to shut-off the combustion engine when the power demand ($P_d$) is below the first threshold $P_1$ and if at the same time the state of charge (SOC) of the vehicle's battery system is above a first SOC threshold ($SOC_1$).

13. The controller of claim 9 wherein the controller is configured for comparing the power demand ($P_d$) with the second threshold $P_2$ and a state of charge of the vehicle's battery with a first SOC threshold and to stop the engine in case the power demand ($P_d$) is below the second threshold $P_2$ and the state of charge is above the first SOC threshold and to run the combustion engine in case the state of charge is below or equal to the first SOC threshold.

14. The controller of claim 9 wherein the controller is further configured to determine a predictive energy demand value ($E_r$) based on geographical and/or traffic information about an intended or expected route and in that the second threshold $P_2$ is a function of the predictive energy demand value ($E_p$).

* * * * *

UNITED STATES PATENT AND TRADEMARK OFFICE
CERTIFICATE OF CORRECTION

| | | |
|---|---|---|
| PATENT NO. | : 10,479,186 B2 | Page 1 of 1 |
| APPLICATION NO. | : 15/759647 | |
| DATED | : November 19, 2019 | |
| INVENTOR(S) | : André Körner et al. | |

It is certified that error appears in the above-identified patent and that said Letters Patent is hereby corrected as shown below:

In the Specification

In Column 4, Line 8, delete "systems" and replace with -- systerns --

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*